Mar. 6, 1923.
D. CROWNFIELD
LIGHTING FIXTURE
Filed Dec. 3, 1919
1,447,238
2 sheets-sheet 1
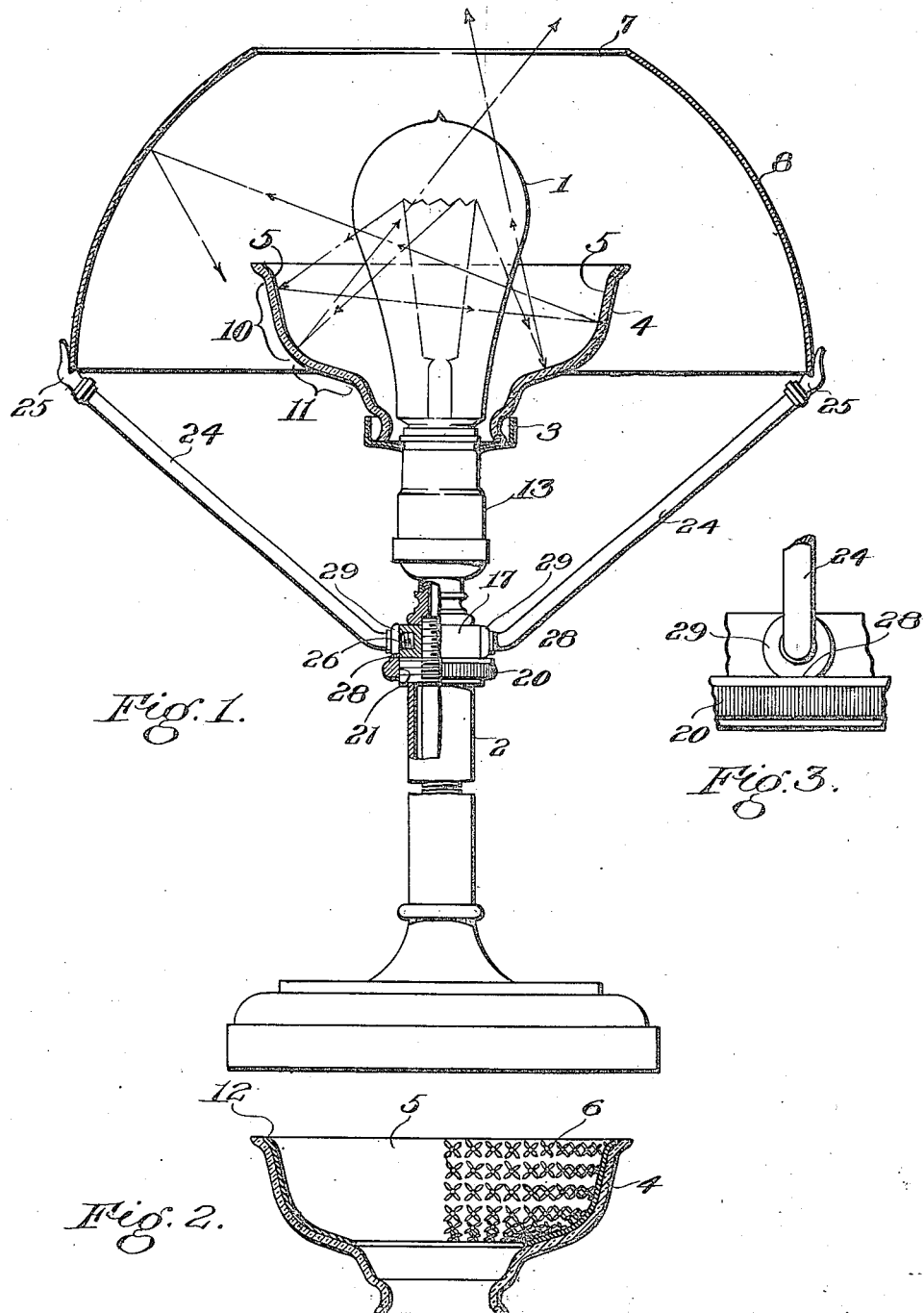

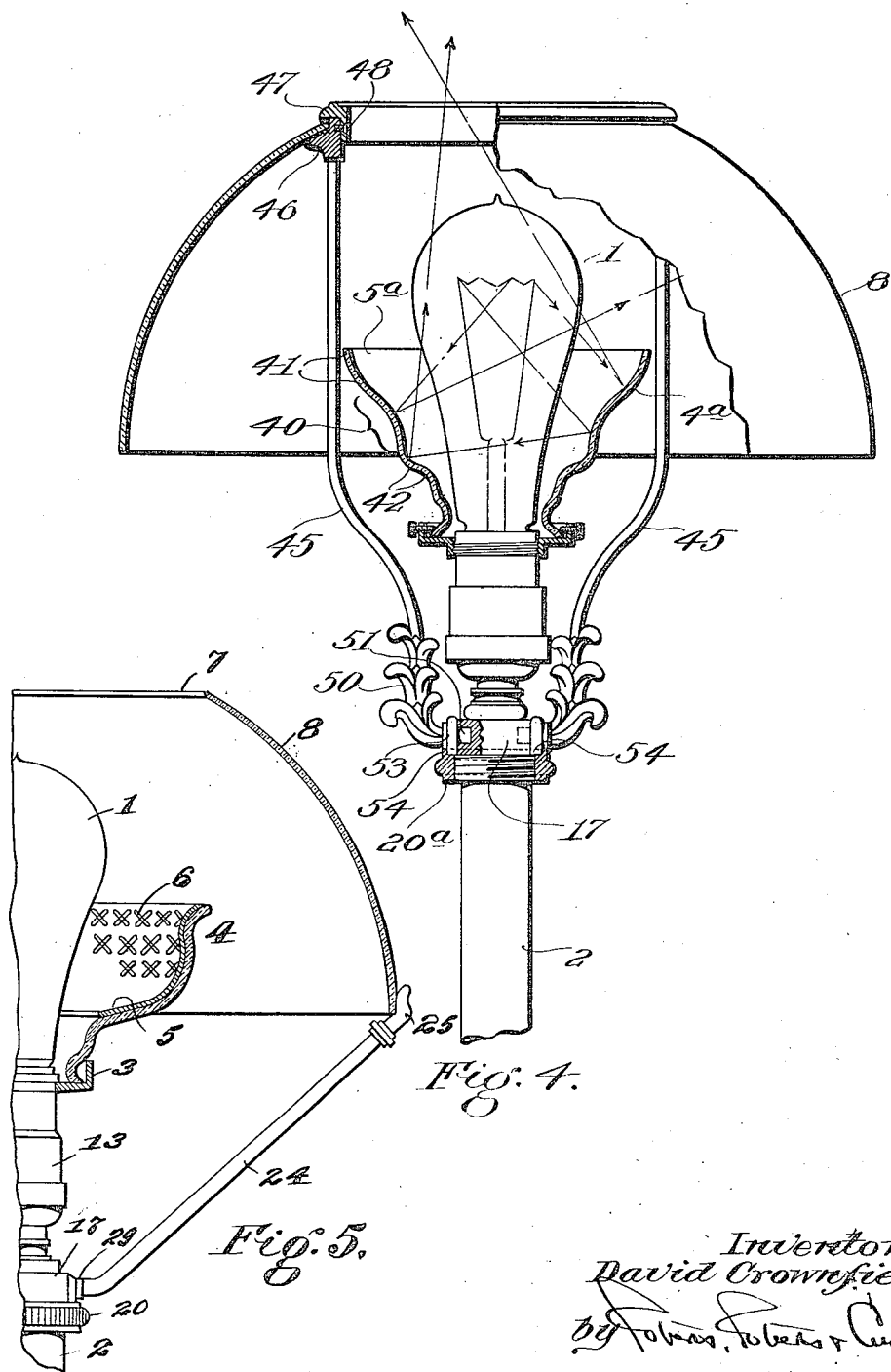

Patented Mar. 6, 1923.

1,447,238

UNITED STATES PATENT OFFICE.

DAVID CROWNFIELD, OF CAMBRIDGE, MASSACHUSETTS.

LIGHTING FIXTURE.

Application filed December 3, 1919. Serial No. 342,182.

*To all whom it may concern:*

Be it known that I, DAVID CROWNFIELD, a citizen of the United States of America, and resident of Cambridge, in the county of Middlesex and State of Massachusetts, have invented new and useful Improvements in Lighting Fixtures, of which the following is a specification.

This invention relates to the economic, scientific and hygienic distribution of artificial light from a single light source, such as a gas, electric, kerosene, acetylene, or other light, in such a manner as to attain, for the lighting of an interior, a light distribution having the combined qualities of diffused light, of light from an indirect system, and of light by reflection.

A principal object of the invention is to protect the retinal functions of the eye from injury by exposure to glare and from the deleterious effects of modern high-powered light sources, while retaining for users the beneficial qualities of such lighting sources in a simple, economic, compact, low-cost, and convenient form. Other objects are to reach these results by the distribution of light from modern artificial light sources by a predetermined and calculated effect of the distributive appurtenances economically effecting the distribution of the light in zones of required usefulness, and with hygienic qualities in so far as the selection of light qualifying media, and the directional distribution of the light may have a preventive effect in protecting the retina of the eye from modern high powered light sources having attendant deleterious brightness contrasts.

I accomplish the purpose set forth in part by distributing the light through a partially encompassing outer shade of glass or other diffusing media, having a top and bottom opening, and of such material that light will be partially diffused in passing through it and also be partially reflected from within it; and in part by reflecting some of the light upwardly by means of an inner shade of highly reflecting properties immediately surrounding the light source, and also in part by means to support the light, the inner shade, and the outer shade in certain fixed scientific and economic relationship. The preferred forms of the invention also provide for certain æsthetic and decorative features as an incident of the operative advantages of the lamp or fixture. I shall explain the invention by reference to particular forms of a lighting fixture, such as a pendant or stand lamp including a light source, an inner highly reflecting shade, and an outer encompassing diffusion and reflecting shade mounted in a predetermined relation.

The relation between the light source, the inner highly reflecting shade, and the outer encompassing diffusing and reflecting shade and the means for supporting these parts may be such that part of the light from the source is permitted to fall directly upon the outer encompassing shade and be in part diffused through it and in part reflected within it around the primary means of support, while part of the light from the source falls upon a lower and inner highly reflecting shade and has its maximum of reflection upwardly through the opposite opening in the outer encompassing shade. The means for achieving the result is by fixed relationship between the various parts of the device so that users may not alter the relationship and so disturb the achievement of the most economic distribution of the light.

By the assemblage of various shades and means of support having certain relational characteristics in fixed physical relation, I distribute the light from a single artificial light source by diffusion in the lateral zone, by direct reflection in the lower zone, and by so-called indirect reflection within certain effective angles in the upper zone, whence by secondary reflection it is redistributed by the ceiling of any room in which the fixture may be placed. By the careful selection of the proper light-qualifying media for the outer shade any danger of deleterious effects from brightness contrast either from the shade or light source are obviated in the lateral zone. Since the light delivered in a frustral cone directly beneath the outer shade is reflected from that shade, there is no danger of brightness contrast from such distribution. The inner shade of highly reflecting material is placed well within the periphery of the outer shade so the eye of the observer or user is well protected from objectionable brightness contrast due to high-powered reflection from its highly reflecting surface.

In order that, when desired, a decorative effect may be imparted to the inner shade, a preferred form of the device includes a shade of contour to effect the purpose set forth having an inner highly reflecting decoratively-perforated shell adapted to give, by varying perforations, various decorative effects. In this form the outer shade preferably is of light transmitting material to permit egress of the light coming through the perforations in the inner reflecting perforated shell, while the inner shell itself may be of any highly reflecting material, or of any material so treated, metallically or otherwise, as to impart a highly reflecting property to its surface. In either case the inner shell, whether or not provided with decorative perforations, permits upon removal, conversion of the lamp from an indirect to a direct shaded fixture with a minimum of difficulty. Referring to the accompanying drawings showing preferred instances of the invention.

Figure 1 is an elevation partly in vertical section of an electric lamp embodying one form of the invention;

Figure 2 is a detail vertical section of an inner shade for use with the fixture shown in Fig. 1;

Figure 3 is a detail elevation of one of the shade supports;

Figure 4 is an elevation, partly in section, of an electric lamp showing another form of outer shade holder and support, and Fig. 5 is a fragmentary view of the upper portion of the lighting fixture forming the subject matter of the present invention and illustrating the incorporation therein of an inner shade of the type shown in Fig. 2.

Referring to the drawings, the species selected for illustration comprises an electric lamp 1 mounted on a standard 2, but it will be understood that the fixture may be pendent or of any other light-distributive form without departure from the invention. Adjacent to the light 1 and supported by a shade holder 3, an inner shade 4 is centrally disposed with relation to the light and partially surrounding it, leaving the upper portion of the spherical space around the light 1 free for direct lighting upwardly and laterally. The inner shade 4 may be of glass, of metal, of glass with a metal interior, or of any material adaptabe to effect the purpose disclosed. If the shade is wholly of glass, it may be of glass of a highly reflecting quality or it may be of clear glass covered with a coating of silver to create a mirrored effect, and may or may not have dispersive surface as may be most desirable and may be best suited to the type of light source used; but under any of these circumstances the shade preferably is arranged to have a highly reflecting character, and is of such contour as to reflect the light impinging on it in a frustral cone whose angle of maximum distribution bears a direct relation to the upper opening 7 in an outer shade 8.

As shown in Figure 1, some of the direct lateral rays from the source 1 are subjected to reflections downwardly to illuminate the lower sector of the sphere of illumination. The outer shade 8 preferably is of light-modifying and diffusing media, permitting some of the light falling on it to be transmitted through it and distributed in the lateral zone, thus softening and modifying the light so distributed and eliminating danger from the brightness contrast, and reflecting some of the light impinging on it from its inner surface through its greater opening beneath. The opening 7 at the top is sufficient for the egress of light from the source and from the reflecting shade 4.

The desired function of the inner shade 4 may be attained in several different ways. As disclosed the inner shade 4 is formed of zones or sectors predominantly conical, for instance a conical zone 10 about 30° wide extends from near the level of the center of the source downwardly, merging into a flatter conical zone comprising the next lower zone of the lower hemisphere of illumination. The contour of this shade 4 is in part dependent upon the type of light source used, and in part dependent on the relational arrangement of the various parts of the device to attain the object sought, which is distribution of light upwardly with intensities lessening with departure from the vertical through the source, and the shape of the shade is developed to attain this end. While the most efficient type of the shade 4 is attained by the use of a glass shade with an inner coating having a high reflecting surface, this high reflecting surface may be attained in any way giving efficient service. In some forms of the lamp or fixture where it is desired to attain a decorative effect or where optional increase of light passing through the bottom opening of the outer shade 8 is desired, this may be accomplished by making the shade as illustrated in Fig. 2, the surface 5 being provided by an independent addition to the material of the shade proper. Such addition may take the form of an opaque reflecting member of proper shape to fit snugly within the inner shade proper when dropped therein. If the shade 4 is made of translucent glass the addition may consist of a metallic shell or in fact a shell of any highly reflecting material conforming to the inner shape of the glass shade, and may if desired have decorative perforations permitting the egress of light, to be thence transmitted through the outer transparent glass in a pattern consonant with the decorative perforations in the inner shell. This inner metal shell may have its inner surface highly polished, and can have a gold, silver, nickel or other coating if desired. This form of the device is shown in Fig. 2, the lining 12 being shown as decoratively perforated at 6.

Whether or not the inner shell of the shade 4 is provided with decorative perforations, it is clear that by its removal from the shade proper, an increased quantity of light will be permitted to pass in lateral and downward directions and that most of its lateral rays will be reflected downwardly by the outer shade 8. Thus, if the inner shade proper be of clear glass, some of the light may pass directly therethrough and downwardly through the bottom of shade 8, while if the shade 4 be of translucent material, it is evident that a semi-direct lighting effect will be obtained, some of the rays being diffused through the material of the shade and some being upwardly reflected from its inner surfaces. Thus by insertion or removal of the inner shell, the amount of light passing through the bottom opening of shell 8 may optionally be varied.

In view of the fixed relations required to attain the best result, it is preferred to so mount the shades 4 and 8 as to provide no opportunities for tampering with or varying the relative positions of the light source and the optical surfaces relied on to attain the best results from the device. Referring to Fig. 1, shade 4 may rest by gravity or be held by clamps in a support 3 firmly attached to the lamp socket 13.

The outer shade supports 24 of any desired decorative form and in any desired number may be provided with threaded ends 26 taking into suitable openings in the finial or collar 17 of the standard 2, and having thereon integral or attached flanges 29 formed with a flat 28 in suitable relation to the desired relative position of the arms 24. This flat 28 is engaged by a hand-screw sleeve 20 suitably threaded internally to engage external threads on the finial or collar 17, and adapted after the arms 24 have been screwed in place to be locked upwardly against the respective flats 28 to prevent rotative motion of the arms 26 and to secure stability. The arms 24 have suitable rests 25 for the shade 8. Such a sleeve and finial may be adapted to any desired decorative form while permitting the shade holding members to be mounted or dismounted without the use of tools.

Another form of shade holder is shown in Fig. 4, in which any desired number of supporting arms 45 pass up inside the shade 8, which is supported from its top edge by a collar 46 and if desired held upon the collar 46 by an annulus 47 suitably fastened as by screws 48 on the collar 46. The lower ends of the arms 45 may have any suitable sculptural decoration as at 50, and preferably are held in place by cylindrical ends 51 taking into radial bores in the collar 17 at the top of the standard 2, each of the arms 50 being provided with a flange 53 having a flat at its lower edge 54 to be engaged by a screw collar 20ª like the collar 20 above mentioned, but in this case provided with an annular locking flange 54 to take outside of the flanges 53 of the arms 45 to hold them locked when in position. It is of course obvious that the ends of the arms 45 may also have screw threaded engagement with the bores in the collar 17, if desired, in addition to the securing means provided by the flange 54.

The invention is susceptible of considerable modification without departing from the new genus of devices comprising it. For instance as shown in Fig. 4 the inner shade 4ª (preferably of glass of the ribbed or figured type giving a refractive dispersion) may be provided with a central sphero-conical belt or zone 40 for distributed reflection through the upper hemisphere of the sphere of illumination, including such part of the shade 8 as may be in range of reflection from its surface; and may have zones 41 and one or more zones 42 for predominant reflection toward the ceiling through the open top of the shade 8. Otherwise the shade 4ª may be like the shade 4, its inner surface 5ª being made as described in connection with shade 4.

I claim:—

1. An inner light transmitting shade device for use in a lighting fixture, comprising a light source and an outer encompassing shade, said inner shade being constructed and arranged to have nested therein an inner opaque perforated shell having a highly reflecting inner surface, means to support the inner and outer shades and the light source, the relation between the light source, the outer shade and the inner shade and its contained perforated shell and the means of support being such that light from the source impinging on the perforated reflecting shell nested in the inner shade will be in part reflected through the opposite opening in the outer shade, and in small part transmitted through the perforations in such shell creating a pattern effect, when exteriorly viewed, on the containing shade.

2. A reflector for lighting fixtures made of light transmitting material, and carrying an inner opaque shell having perforations permitting the passage of light from any contained source to become emergent through the outer container.

3. A reflector for lighting fixtures, made of light transmitting material, and carrying an inner opaque shell throughout a zonal portion of its extent, the inner shell having perforations permitting the passage of light to and through the outer transmitting material.

4. A reflector for lighting fixtures, made of light transmitting material, and carrying an inner opaque shell throughout a zonal portion of its extent, the inner shell having perforations permitting the passage of light to and through the outer transmitting material, and having a highly reflecting inner surface.

5. A lighting fixture having a standard and a shade support carried thereby, said shade support comprising a member having a plurality of spaced sockets therein, arms seated within the respective sockets, said arms each having an outstanding member adjacent its point of engagement with its socket, and an annular ring simultaneously engageable with the several outstanding members for retaining said arms within their sockets.

6. A lighting fixture having a standard and a shade support carried thereby, said support comprising an annular member having radial openings therein, arms engaging the respective openings, collars fast upon said arms adjacent said annular member, each collar having a flat upon its peripheral surface, and an internally screw threaded sleeve engaging threads upon the outer surface of said standard, said sleeve having a surface engageable with the respective flats of said collars, and a flange for engaging the outer faces of said collars.

7. A lighting fixture having a standard, arms upstanding therefrom, a shade supporting collar mounted upon the upper ends of said arms, said collar having an outwardly projecting flange, a shade provided with an opening at its top and having its upper edge-portion resting upon said flange, an annulus comprising a radially extending flange overlying the upper edge of the shade, and means for securing said annulus to the collar.

Signed by me at Boston, Massachusetts, this twenty-fifth day of November, 1919.

DAVID CROWNFIELD.